United States Patent [19]
Werth

[11] 3,847,667
[45] Nov. 12, 1974

[54] ALKALI METAL-POROUS CONDUCTIVE CARBON BATTERY HAVING A MOLTEN ALKALI METAL CHLORALUMINATE ELECTROLYTE

[75] Inventor: John J. Werth, Princeton, N.J.

[73] Assignee: ESB Incorporated, Philadelphia, Pa.

[22] Filed: Sept. 26, 1972

[21] Appl. No.: 292,281

[52] U.S. Cl. .............................. 136/6 FS, 136/155
[51] Int. Cl. .......................................... H01m 43/00
[58] Field of Search .. 136/6 FS, 6 F, 6 FL, 20.83 T, 136/83 R, 100 R, 153, 155

[56] References Cited
UNITED STATES PATENTS

| | | | |
|---|---|---|---|
| 3,404,035 | 10/1968 | Kummer et al. | 136/6 FS |
| 3,404,036 | 10/1968 | Kummer et al. | 136/6 FS |
| 3,415,687 | 12/1968 | Methlie | 136/100 R |
| 3,751,298 | 8/1973 | Senderoff | 136/6 F |

*Primary Examiner*—Anthony Skapars

[57] ABSTRACT

A secondary battery utilizing a molten alkali metal anode, a porous conductive carbon cathode, a molten alkali metal chloraluminate electrolyte and a selectively-ionically-conductive separator positioned between the anode and the cathode and a process for producing alkali metal therewith.

13 Claims, 2 Drawing Figures

3,847,667

ALKALI METAL-POROUS CONDUCTIVE CARBON BATTERY HAVING A MOLTEN ALKALI METAL CHLORALUMINATE ELECTROLYTE

BACKGROUND OF THE INVENTION

1. Field of the Invention

This invention relates to a secondary battery utilizing a molten alkali metal anode with a solid separator, a carbon cathode and molten salt electrolyte. More particularly, the solid separator is selectively-ionically-conductive with respect to cations of the anode; the cathode comprises conductive porous carbon and the molten electrolyte salt comprises molten alkali metal chloraluminate. This battery possesses a voltage potential substantially higher than those batteries now known in the art which utilize molten salt electrolytes and at an operating temperature substantially below the operating temperature of other molten salt batteries possessing even relatively high voltage potentials. Substantially pure alkali metal can be produced during charging of this battery.

2. Description of the Prior Art

The use of molten or fused salts as electrolytes in secondary batteries is not new to the art. Such batteries utilize as the electrolyte an inorganic salt composition which is solid and non-conducting at ordinary temperatures. However, when the cell is activated by heating it to a temperature sufficiently high to fuse or melt the electrolyte, the molten electrolyte becomes conductive so that electrical energy may be withdrawn therefrom. Such types of secondary batteries are known for their high energy storage and power output capabilities.

Typical secondary batteries of this type utilize a molten alkali metal as the anode-reactant, a cationically-conductive crystalline structure as a separator electrolyte and a molten sodium polysulfide or sulfur cathodic reactant-electrolyte which will, during charging and discharging, contain ionic sodium polysulfide. The voltage potential of such a battery is generally in the range of from about 2 to 2.2 volts. It is recognized by those skilled in the art, however, that batteries of this type cannot operate below about 265°C because the sodium polysulfide which is present in the cathodic reactant-electrolyte during charging and discharging must be maintained in molten state and its melting point is as high as 265°C depending on the state of the charge. It is equally well-known that this operation of this type of battery at about or above 265°C cannot be carried out without attendant problems. For example, sodium polysulfide is a strong oxidizng agent at these elevated temperatures and will tend to effect rapid corrosion thus seriously reducing the useful life of the battery.

A novel secondary battery has now been discovered which utilizes a conductive porous carbon cathode in contact with a molten sodium chloraluminate electrolyte. This battery can operate at a temperature as low as from about 150°C to about 200°C and greatly reduce the corrosion problems since sodium chloraluminate at temperatures of from about 150°C to about 200°C, is not a strong oxidizing agent. Additionally, it has been found that the voltage potential of the novel battery of this invention approaches 4 volts.

SUMMARY OF THE INVENTION

This invention is directed to a novel secondary battery comprising in combination a molten alkali metal anode, a cathode comprising conductive porous carbon, a solid member separating the anode and the cathode and a molten electrolyte on the cathode side of the solid member. The solid member which separates the anode and the cathode is selectively-ionically conductive with respect to the cations of the molten alkali metal anode. The molten electrolyte on the cathode side of the solid member comprises molten alkali metal chloraluminate. The alkali metal of the anode is also present in the alkali metal chloraluminate.

The process aspect of this invention is directed to a novel process for producing substantially pure alkali metal. This process comprises applying to the battery of this invention, when it is in the discharged state, an external source of electrical power thereby causing electrons to flow into the molten alkali metal anode of the battery. A difference of electrical potential is thus created within the battery causing alkali metal ions present on the cathode side of the solid member to pass through the solid member into the anode. Alkali metal ions then present on the anode side of the solid member are reduced to alkali metal by the inflowing electrons.

DESCRIPTION OF THE INVENTION

Figure 1:
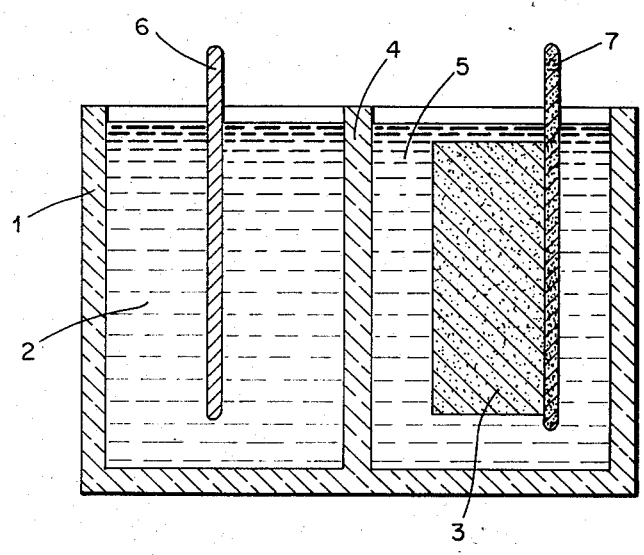
FIG. 1 is a schematic, cross-sectional view of a simple cell in accordance with this invention.

In the operation of the secondary or rechargeable battery of this invention, a high voltage potential is achieved by utilizing a molten alkali metal anode and a conductive porous carbon cathode, separating the two by means of a solid member which is selectively-ionically conductive with respect to cations of the molten alkali metal anode and maintaining on the cathode side of the solid separating member a molten electrolyte comprising molten alkali metal chloraluminate.

In accordance with this invention, the anodic reactant or reductant is an alkali metal or mixture of alkali metals maintained above its melting point when the cell is in operation. The anodic reactant is heated by any conventional means such as induction heating by electrical means, direct heating or indirect heat exchange with a suitable heated fluid heat exchange means. This anodic reactant or anode functions as a conductor through which electrons flow to the external circuit during discharge. While no critical limitations are imposed upon the alkali metal selected for use as an anode herein, the desired operating temperatures of this battery are preferably within the range of from about 150°C to about 200°C and the metal selected should therefore preferably have a melting point within or below this temperature range. The preferred metal for use as the anode is sodium.

The cathode of the present invention comprises porous conductive carbon. The conductive carbon cathode may be in any form such as powdered or rigid structural-skeletal form and may be prepared by any of the numerous methods known to those skilled in the art, e.g., powdered carbon may be mixed with coal tar pitch and heat pressed into rods or sheets, see also for example, U.S. Pat. No. 3,615,829. The useful end product, i.e., the carbon electrodes thus prepared must, however, manifest sufficient porosity to adsorb on its surface chloride ions and chlorine atoms which are present in the cathodic electrolyte. This ability of the chlorine to adsorb on the surface of the activated charcoal greatly reduces the toxicity and vapor pressure of the chlorine and avoids the high pressures or low cooling temperatures required in other batteries where chlorine must be converted to the liquid state during recharge.

Additionally, and more preferably, the pores of the conductive carbon electrode may be filled or packed with granular or powdered activated charcoal particles of high surface area. Examples of such useful charcoals for this purpose include Pittsburgh CAL (12 × 40), BPL (4 × 40), NXC 6/8 and SGL (8 × 30) and the like. These charcoals do not conduct electrically, so that normally any chlorine adsorbed on their surface would not be electrochemically useful. However, by placing them in a close packed structure such as the pores of porous carbon electrode of the present invention, the charcoal particles are made to lie in close proximity to some electrically conducting portion of the carbon electrode. Consequently, chlorine which had been adsorbed on the charcoal can diffuse over to the conducting carbon electrode at a rate sufficient to support a useful discharge current. Conversely, chlorine adsorbed on the conducting carbon electrode, i.e., the porous carbon, during recharge can diffuse through the molten cathodic electrolyte to a nearly non-conductive charcoal surface for storage. The advantage of this construction is that activated charcoals can have a much higher surface area and yet cost much less than high surface conducting carbon electrodes of the same weight. In fact, it is possible in the present invention to utilize as the carbon electrode an inexpensive, low surface carbon electrode thus allowing the majority of the chlorine storage to be effected by the charcoal which is present.

In addition to the porosity requirement of the conductive carbon electrode, it should also be noted that charging of this electrode should likewise be controlled. The electrode should be charged to a level just below that at which chloride ions or chlorine atoms which are adsorbed on its surface would be converted in significant amounts to molecules of free chlorine gas.

The solid member which separates the anode and the cathode in the instant invention must be selectively-ionically-conductive with respect to cations of the molten metal anode. Materials suitable for use as the solid separator include glass, beta aluminas and any other cation conductive crystalline and/or ceramic materials which are resistant to the molten metal anode and have satisfactorily low resistivities. The preferred separator comprises a beta alumina cationically conductive crystalline structure consisting essentially of structural lattice and alkali metal cations which are mobile in relation to said lattice when a difference of electrical potential is provided on opposite sides thereof. The lattice preferably is made up of a major portion by weight of ions of aluminum and oxygen and a minor portion by weight of ions of metal having a valance not greater than 2 in crystal lattice combination such as lithium and magnesium. The solid separator member may be prepared by any art known means, see for example, U.S. Pat. No. 3,535,163, so long as the useful end product is selectively-ionically conductive with respect to the cations of the molten alkali metal anode employed.

The electrolyte utilized in the present invention makes possible a substantial reduction in the operating temperature of molten salt batteries as compared with those presently known and used in the art. For example, the operating temperature of the normal molten alkali metal-molten sulfur secondary battery wherein the molten cathodic electrolyte is an ionized combination of sodium and sulfur, i.e., ions of sodium polysulfide, $Na_2S_5$, the operating temperature is recognized to be well above 200°C and closer to 300°C, the melting temperature of sodium polysulfide being as high as 265°C ($Na_2S_5$). In marked contrast, the battery of the present invention utilizes an electrolyte on the cathode side of the solid separating member which comprises molten alkali metal chloraluminate and permits the operation of the instant battery to be carried out at temperatures as low as from about 150°C to about 200°C, the melting point of the electrolyte being as low as about 125°C depending on the state of the charge. By the term molten alkali metal chloraluminate as used herein is meant a mixture of those atoms, molecules and ions present upon the heating of the particular alkali metal chloraluminates to these operating temperatures, e.g., alkali metal ions, alkali metal chloride molecules, alkali metal chloraluminate molecules, chloride ions, chlorine atoms, $AlCl_3$, $AlCl_4^-$, and $Al_2Cl_7^-$. These will vary according to the particular alkali metal utilized in the chloraluminate. Sodium is preferred. The advantages of operating at this reduced temperature are of course apparent, e.g., reduced corrosion and increased battery life. The electrolyte may be readily prepared by any means known in the art such as mixing sodium chloride and aluminum chloride and heating until ions of $NaAlCl_4$ are formed. The alkali metal useful as anode materials in this invention are also useful in the metal chloraluminate; however, the alkali metal utilized in any particular battery as the anode must also be present as at least one of the alkali metals present in the alkali metal chloraluminate of that particular battery. Most salts, including alkali metal chloraluminate, contract about 20 percent by volume on freezing. Hence, a battery may for example, be assembled and sealed at room temperature using either pressed or pre-cast salt pellets. Pressed pellets can be made for example by pre-fusing NaCl and $AlCl_3$ to $NaAlCl_4$, grinding the fused salt to a powder and pressing it. Cast pellets can be made by pouring molten salt into a cold metal mold. The salt freezes first where it touches the metal and contracts away from the walls of the mold. Due to this contraction, the pellet can be removed from the mold by inverting it; no releasing agent is necessary.

If one uses a sintered porous carbon electrode in the battery, it can be dipped into a bath of the molten salt supported by an inert material, e.g., Fiberglas and then be removed from the melt and allowed to freeze.

If a powdered carbon electrode is used, it can for example be mixed with the ground salt, heated to the melting temperature of the salt and cast into cold metal molds.

Referring now to FIG. 1, a single cell secondary battery according to this invention is constructed having a cell container 1 which may be made of any suitable material or materials providing both heat and electrical insulation, e.g., refractory materials, certain heat and chemical resistant polymers, ceramics, crystalline materials, a suitable glass or a beta alumina or derivative thereof or steel or iron thermally insulated with fiberglass. Inside container 1 is the molten alkali metal anodic reactant (anode) 2, e.g., sodium. It is separated from the porous conductive carbon cathode 3 by means of a solid separating member 4 which is selectively-ionically-conductive to cations. An electrolyte of molten alkali metal chloraluminate 5 e.g., molten $NaAlCl_4$, is on the cathode side of separator 4 and in contact with cathode 3. Leads 6 and 7 provide means for connecting the cell with an external circuit and closing the circuit. The external circuit, not further shown, may include a voltmeter, ammeter, etc.

In this cell the molten alkali metal 2 serves both as the anodic reactant and as an electrode while the molten alkali metal chloraluminate 5 serves both as the cathodic reactant and as an electrolyte which is in contact with the porous conductive carbon electrode 3.

In the charged state electron holes or deficiencies are present on the periphery of the conductive carbon electrode 3 and chloride ions are stored on the surface of the carbon electrode 3 in close proximity to the electron holes. During discharge electrons enter the conductive carbon electrode 3 through lead 7. The electrons flowing through carbon electrode 3 fill the electron holes on its periphery thus releasing the chloride ions on its surface. The released chloride iones then enter the electrolyte 5 as $Cl^-$, $AlCl_4^-$, $Al_2Cl_7^-$, etc. ions. Chlorine atoms are also stored on the surface of the charged carbon electrode.

At the same time in the anodic half of the cell, the molten alkali metal gives up electrons and passes through the cationically selective separating member 4 as alkali metal ions. The electrons flow into the external circuit through lead 6 completing the circuit.

Recharging is effected by impressing an external source of electric power upon the circuit with a reverse electron flow in relation to that of the discharge half-cycle first described.

During the operation of this battery, the temperature of the molten alkali metal anode and molten alkali metal chloraluminate is maintained at about 150°C to about 200°C and the voltage potential of the battery is from about 2 to 3.5 volts when porous carbon electrode 3 is utilized and from about 3 to about 4 volts when the pores of the carbon electrode are packed with nonconductive charcoal particles. The specific energy of the carbon electrode is about 50 Whrs/lb. while the specific energy of the charcoal packed carbon electrode is about 100 – 150 Whrs/lb.

Figure 2:
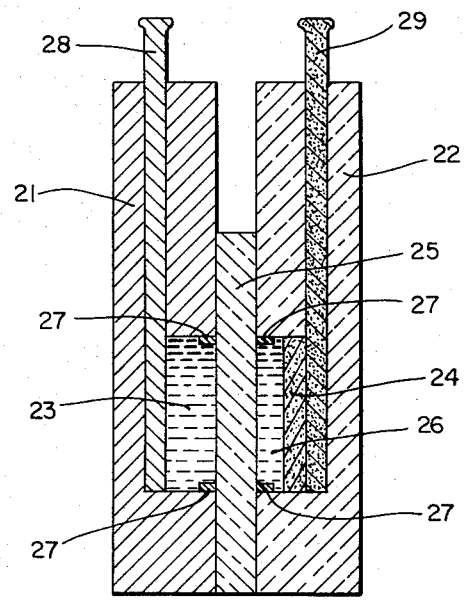
FIG. 2 is a schematic, cross-sectional view of a more complex cell design in accordance with this invention.

Referring now to FIG. 2, there is shown a cross-section of an embodiment of this invention which differs from the cell of FIG. 1 in that the anode 23 is contained in a well in a suitable container 21 such as steel, iron or the like and the cathode 24 and electrolyte 26 are contained in a well in a suitable separate container 22 of ceramic, glass or the like. The two containers are pressed together and the anode is kept separated from the cathode and electrolyte by means of a suitable cat-ionically selective solid member 25. The contact joints between the separating member 25 and the anode and cathode containing wells are sealed with a seal 27 made of a suitable material, e.g., Teflon, grafoil gasket or the like as the positive electrode seal and copper gasket filled with a resilient material, grafoil gasket or the like at the negative electrode. Leads 28 and 29 serve the same function as their counterparts in FIG. 1. Discharge and recharge of this cell are carried out in the same manner as described above.

It has also been discovered that by charging a battery of this invention, as described above, substantially pure alkali metal can be produced. In the discharged state, a battery of this invention utilizing a molten alkali metal anode and a molten alkali metal chloraluminate electrolyte comprises:

1. A molten alkali metal anode,
2. A cathode comprising conductive porous carbon,
3. A solid member separating the anode and the cathode, which solid member is selectively-ionically-conductive with respect to cations of the molten alkali metal anode, and
4. A molten alkali metal chloraluminate electrolyte on the cathode side of the solid member, wherein the alkali metal of the anode is also present as at least one alkali metal of the chloraluminate.

By charging this battery, i.e., impressing an external source of electrical power upon the circuit of the battery, an electron flow opposite that of the discharging electron flow is effected. Electrons flow therefore from the cathode and into the anode thus creating a difference of electrical potential within the battery. As a result of this now existing difference of electrical potential, alkali metal ions which are present in the molten alkali metal chloraluminate on the cathode side of the solid member are attracted to the anode and pass through the solid member into the anode. As a result of electrons flowing into the anode, alkali metal ions now present in the anode are reduced to substantially pure alkali metal. This process can be carried out at temperatures as low as from about 150°C – 200°C.

By substantially pure alkali metal as used herein is meant an alkali metal free from any extraneous metal whose valance is greater than 2. The presence of any other non-metallic impurities in the final alkali metal product will be determined largely by their presence in the starting materials utilized as anode and electrolyte. The alkali metal thus formed may be recovered by any means known in the art, for example, wicking or drawing off the substantially pure molten alkali metal through a tap.

The process of the present invention affords many advantages to the user, for example, substantially pure alkali metal can be prepared from relatively inexpensive starting electrolyte materials, e.g., NaCl in the production of $NaAlCl_4$ electrolyte, KCl in the production of $KAlCl_4$ etc. Further, utilization of the process of this invention avoids problems which attend art known processes. The process of this invention can be carried out at temperatures as low as from about 150°C to about 200°C as compared with, for example, the "Downs Process" for producing sodium which operates at a temperature of about 590°± 5°C, and the reduction of molten KOH with carbon in the presence of a hydrogen gas stream at from about 800° – 960°C to produce potassium. Thus, the process of this invention will effect extended life of the apparatus employed; reduce the thermal insulative requirements of the process apparatus and permit the use of less costly process apparatus materials which might react or corrode at the elevated temperature of other processes. Additionally, since the separating member of the battery utilized in the process of this invention is selectively-cationically-conductive, many impurities are excluded from the desired end product, e.g., metals having a valence of greater than 2 which may be present in the starting electrolyte materials cannot pass into the alkali metal anode side of the separator from whence the substantially pure alkali metal is recovered. Also, calcium ions cannot pass through the separator and therefore calcium which may be present in the starting electrolyte will be excluded from the substantially pure end products as will other sedementary impurities of the electrolyte thus eliminating the need for additional purifying means such as those employed with the "Downs Process."

The foregoing detailed description has been given for clarity of understanding only and no unnecessary limitations are to be understood therefrom. The invention is not limited to the exact details shown and described for obvious modifications will occur to one skilled in the art.

The embodiments of the invention in which an exclusive property or privilege is claimed are defined as follows:

1. A secondary battery comprising in combination:
   a. a molten alkali metal anode;
   b. a cathode comprising conductive porous carbon;
   c. a solid member separating the anode and the cathode, said member being selectively-ionically-conductive with respect to cations of said molten alkali metal anode; and
   d. a molten alkali metal chloraluminate electrolyte on the cathode side of the solid member, wherein the alkali metal of the anode is also present in the alkali metal chloraluminate.

2. A battery according to claim 1 wherein the melting point of the electrolyte is from about 150°C – 200°C.

3. A battery according to claim 1 wherein the alkali metal of the anode and the chloraluminate is sodium.

4. A battery according to claim 1 wherein the solid member is beta alumina.

5. A battery according to claim 3 wherein the solid member is beta alumina.

6. A battery according to claim 5 wherein the melting point of the electrolyte is from about 150°C to 200°C.

7. A battery according to claim 6 wherein the conductive porous carbon cathode is a rigid skeletal structure.

8. A battery according to claim 1 wherein the cathode comprises conductive porous carbon the pores of which contain therein non-conductive charcoal particles.

9. A battery according to claim 8 wherein the alkali metal of the anode and the chloraluminate is sodium.

10. A battery according to claim 8 wherein the solid member is beta alumina.

11. A battery according to claim 9 wherein the solid member is beta alumina.

12. A battery according to claim 11 wherein the melting point of the electrolyte is from about 150°C to 200°C.

13. A battery according to claim 12 wherein the conductive porous carbon cathode is a rigid skeletal structure.

* * * * *